US011333505B2

(12) United States Patent
Zhang et al.

(10) Patent No.: US 11,333,505 B2
(45) Date of Patent: May 17, 2022

(54) METHOD AND SYSTEM TO GENERATE UPDATED MAP DATA FOR PARALLEL ROADS

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 198 days.

(21) Appl. No.: 16/574,791

(22) Filed: Sep. 18, 2019

(65) Prior Publication Data
US 2021/0080265 A1 Mar. 18, 2021

(51) Int. Cl.
*G01C 21/32* (2006.01)
*G08G 1/0967* (2006.01)
(Continued)

(52) U.S. Cl.
CPC ............ *G01C 21/32* (2013.01); *G01C 11/025* (2013.01); *G01C 11/06* (2013.01); *G01C 21/26* (2013.01);
(Continued)

(58) Field of Classification Search
CPC ............ G06K 9/00818; G06K 9/6201; G08G 1/09623; G08G 1/096783; G08G 1/0967;
(Continued)

(56) References Cited

U.S. PATENT DOCUMENTS 7,374,255 B2 * 5/2008 Mori ...................... B60K 23/04
180/248
8,725,394 B2 * 5/2014 Bahlmann ............ G08G 1/0962
701/117

(Continued)

FOREIGN PATENT DOCUMENTS

JP 2012185076 A 9/2012
JP 2017045193 A2 3/2017

OTHER PUBLICATIONS

Zhang et al., "Insert Beyond the Traffic Sign Recognition: Constructing an Autopilot Map for Autonomous Vehicles", Proceedings of the 26th ACM SIGSPATIAL International Conference on Advances in Geographic Information Systems, Nov. 6-9, 2018, 4 pages.

(Continued)

*Primary Examiner* — Dale W Hilgendorf
*Assistant Examiner* — Alexander C. Bost
(74) *Attorney, Agent, or Firm* — Ditthavong, Steiner & Mlotkowski

(57) ABSTRACT

A system, a method, and a computer program product for generating updated map data are provided. The method comprises obtaining map data of a speed sign associated with a plurality of parallel roads, determining one or more effective links associated with the speed sign, based on the map data of the speed sign, determining first vehicle sensor data corresponding to the one or more effective links, and generating a speed index for each of the one or more effective links based on the first vehicle sensor data The method further comprises generating the updated map data (Continued)

based on the speed index for each of the one or more effective links.

18 Claims, 8 Drawing Sheets

(51) Int. Cl.
*G01C 11/06* (2006.01)
*G06K 9/62* (2022.01)
*G01C 21/36* (2006.01)
*G01C 21/26* (2006.01)
*G08G 1/0962* (2006.01)
*G01C 11/02* (2006.01)
*G01C 21/30* (2006.01)

(52) U.S. Cl.
CPC ......... *G01C 21/30* (2013.01); *G01C 21/3602* (2013.01); *G06K 9/6201* (2013.01); *G08G 1/0967* (2013.01); *G08G 1/09623* (2013.01); *G08G 1/096708* (2013.01); *G08G 1/096783* (2013.01)

(58) Field of Classification Search
CPC ........................ G08G 1/096708; G01C 21/26; G01C 11/025; G01C 11/06; G01C 21/30; G01C 21/3602
See application file for complete search history.

(56) References Cited

U.S. PATENT DOCUMENTS

| | | | |
|---|---|---|---|
| 9,460,355 | B2 | 10/2016 | Stenneth et al. |
| 2015/0367779 | A1* | 12/2015 | Ohdachi ............ G08G 1/09675 340/905 |
| 2016/0104049 | A1* | 4/2016 | Stenneth ............. G06K 9/3258 382/155 |
| 2016/0104376 | A1* | 4/2016 | Fowe ................... G08G 1/0129 701/119 |
| 2016/0117923 | A1* | 4/2016 | Dannenbring ..... G08G 1/09623 340/905 |
| 2016/0137127 | A1* | 5/2016 | Yokochi ................ B60K 35/00 348/148 |
| 2016/0332517 | A1* | 11/2016 | Fujimaki ............ G06K 9/00818 |
| 2018/0023959 | A1* | 1/2018 | Ivanov .................... G01S 19/51 701/469 |
| 2018/0174447 | A1 | 6/2018 | Pellolio et al. |
| 2018/0174449 | A1* | 6/2018 | Nguyen ............... G08G 1/0104 |
| 2018/0224293 | A1* | 8/2018 | Xu ..................... G01C 21/3446 |
| 2018/0225530 | A1* | 8/2018 | Kunze ................ G06K 9/00798 |
| 2018/0253612 | A1* | 9/2018 | Koyama ........... B60W 50/0098 |
| 2019/0050907 | A1* | 2/2019 | Nomura ............. G06K 9/00785 |
| 2019/0094036 | A1* | 3/2019 | Osaki .................. G08G 1/0125 |
| 2020/0193194 | A1* | 6/2020 | Zhang ............... B60W 50/0098 |
| 2020/0242377 | A1* | 7/2020 | He ..................... G06K 9/00818 |
| 2020/0394426 | A1* | 12/2020 | Ro ..................... G06K 9/00818 |

OTHER PUBLICATIONS

Tradisauskas et al., "Map Matching for Intelligent Speed Adaptation", Apr. 2009, retrieved from http://pure.au.dk/portal/files/45413591/2532_nerius.pdf, pp. 1-12.

Guo et al., "Urban Link Travel Speed Dataset From a Megacity Road Network", Scientific Data, vol. 6, Article No. 61, retrieved from https://www.nature.com/articles/s41597-019-0060-3.pdf, published May 16, 2019, pp. 1-8.

Cho et al., abstract of "A Basis of Spatial Big Data Analysis with Map-matching System", Sep. 2017, vol. 20, Issue 3, 7 pages.

* cited by examiner

| | SPEED INDEX OF MAP-MATCHED LINK | | | SPEED INDEX OF LEFT PARALLEL LINK | | | SPEED INDEX OF RIGHT PARALLEL LINK | | |
|---|---|---|---|---|---|---|---|---|---|
| SIGN INFO | MEAN | MEDIAN | PERCENTILE | SD | MEAN | MEDIAN | PERCENTILE | SD | MEAN | MEDIAN | PERCENTILE | SD |

FIG. 7

METHOD AND SYSTEM TO GENERATE UPDATED MAP DATA FOR PARALLEL ROADS

TECHNOLOGICAL FIELD

An example embodiment of the present invention generally relates to mapping and navigation applications, and more particularly relates to a system, a method, and a computer programmable product for generating updated map data for parallel roads.

BACKGROUND

Various navigation applications are available to provide assistance (for example, directions) for driving, walking, or other modes of travel. Web-based systems and mobile app-based systems offer navigation applications that allow a user to request directions from one point to another. Generally, posted speed signs which are posted on a roadside, are learned from sensor data captured by vehicles. The sensor data comprises images of a road and road surroundings and/or data thereof. Oftentimes sensors onboard a vehicle may capture a road sign on a road well before the vehicle actually crosses the corresponding location of the sign on the road. Also, due to a wide field-of-view of most of the image sensors, it is highly likely that road signs posted on other roads may also get captured by the onboard sensors. Especially, in the context of parallel roads, sensors onboard a vehicle travelling on a current road may capture road signs posted on the parallel roads, in addition to the road signs for the current road. As such, the vehicle may incorrectly associate the road sign on the parallel road with the current road. Such erroneous data when learnt by the map database may lead to development of an inaccurate map database which may not be suitable for providing reliable navigation assistance.

BRIEF SUMMARY

Accordingly, there is a need for generating accurate map data for parallel roads, thereby leading to development of a highly accurate and reliable mapping platform that can be used for providing high quality navigation assistance.

A method, a system, and a computer program product are provided in accordance with an example embodiment described herein for generating updated map data for a plurality of parallel roads.

Embodiments of the disclosure provide a system for generating updated map data for a plurality of parallel roads, the system comprising a memory configured to store computer program code and at least one processor configured to execute the computer program code to obtain map data of a speed sign associated with the plurality of parallel roads, determine one or more effective links associated with the speed sign, based on the map data of the speed sign, determine first vehicle sensor data corresponding to the one or more effective links and generate a speed index for each of the one or more effective links based on the first vehicle sensor data. The at least one processor is further configured to generate the updated map data based on the speed index for each of the one or more effective links.

According to one embodiment, to determine the one or more effective links, the at least one processor is further configured to determine a map-matched location of the speed sign based on the map data of the speed sign, determine one or more downstream links in a downstream of the speed sign, based on the map data of the speed sign and the map-matched location and search for the one or more effective links, among the one or more downstream links, based on a threshold distance from the map-matched location.

According to one embodiment, to determine the first vehicle sensor data, the at least one processor is further configured to obtain second vehicle sensor data of a region within a threshold distance from the speed sign, map-match the second vehicle sensor data to one or more first links in the region, and determine the first vehicle sensor data for one or more second links of the one or more first links, based on a match of the one or more effective links with the one or more first links.

According to one embodiment, to generate the speed index for each of the one or more effective links, the at least one processor is further configured to determine speed data for the one or more effective links based on the first vehicle sensor data and generate the speed index for each of the one or more effective links based on the speed data for the one or more effective links.

According to one embodiment, the speed data for the one or more effective links comprises at least one of a mean speed, a median speed, or an 85th percentile speed.

According to one embodiment, to generate the updated map data, the at least one processor is further configured to generate speed value of the speed sign based on the map data of the speed sign, compare the speed value of the speed sign and the speed index of each of the one or more effective links to determine a best match link for the speed sign among the one or more effective links and generate the updated map data based on the best match link for the speed sign.

According to one embodiment, the at least one processor is further configured to receive third vehicle sensor data corresponding to the speed sign from one or more users and transmit a notification message to the one or more users based on the updated map data.

Embodiments of the disclosure provide a method for generating updated map data for a plurality of parallel roads. The method comprises obtaining map data of a speed sign associated with the plurality of parallel roads, determining one or more effective links associated with the speed sign, based on the map data of the speed sign, determining first vehicle sensor data corresponding to the one or more effective links, generating by at least one processor, a speed index for each of the one or more effective links based on the first vehicle sensor data, and generating the updated map data based on the speed index for each of the one or more effective links.

Embodiments of the disclosure provide a computer program product comprising at least one non-transitory computer-readable storage medium having stored thereon computer-executable program code instructions which when executed by a computer, cause the computer to carry out operations for generating updated map data for a plurality of parallel roads. The operations comprise obtaining map data of a speed sign associated with the plurality of parallel roads, determining one or more effective links associated with the speed sign, based on the map data of the speed sign, determining first vehicle sensor data corresponding to the one or more effective links, generating a speed index for each of the one or more effective links based on the first vehicle sensor data, and generating the updated map data based on the speed index for each of the one or more effective links.

BRIEF DESCRIPTION OF THE DRAWINGS

Figure 1:
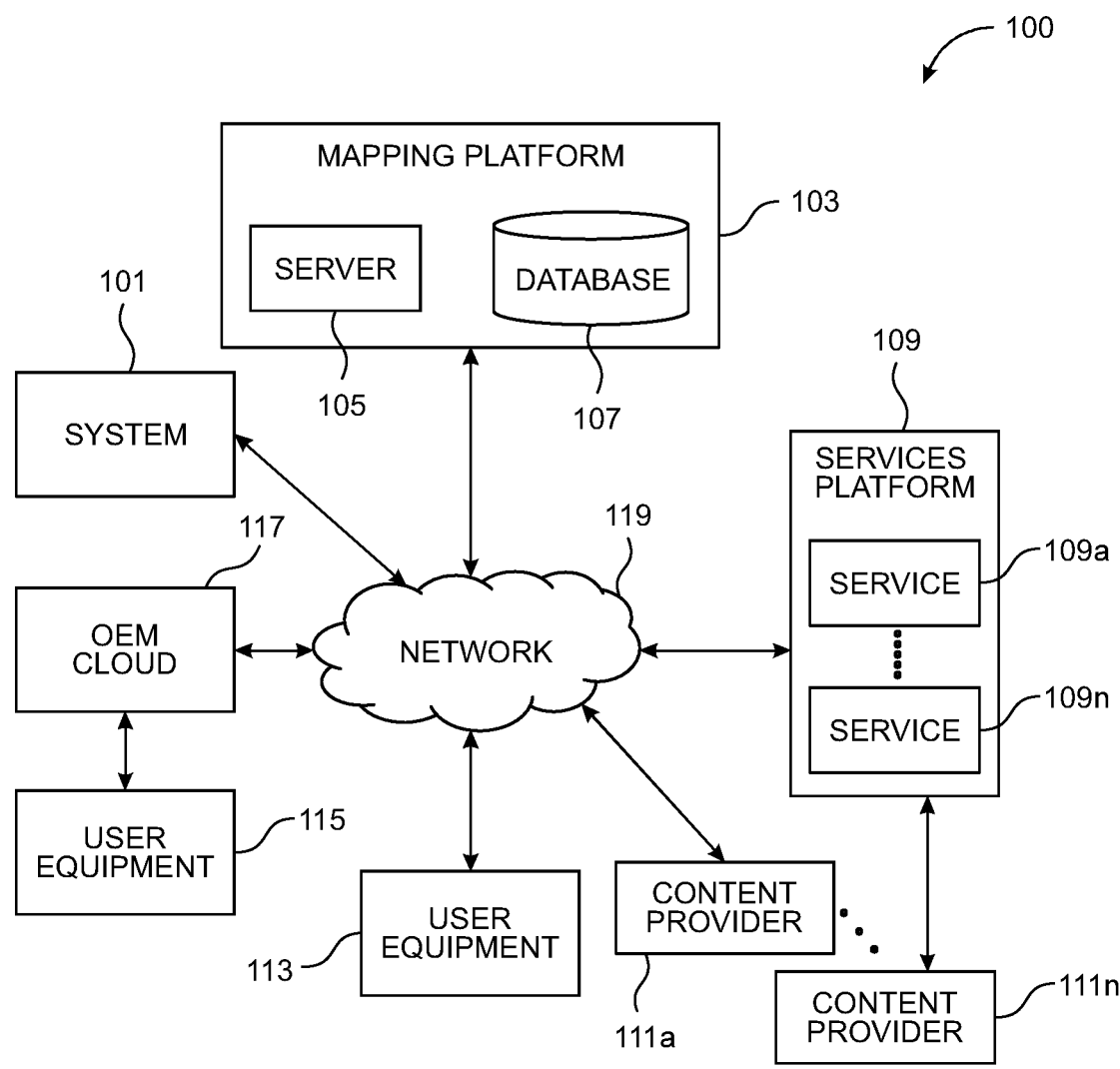
Figure 2:
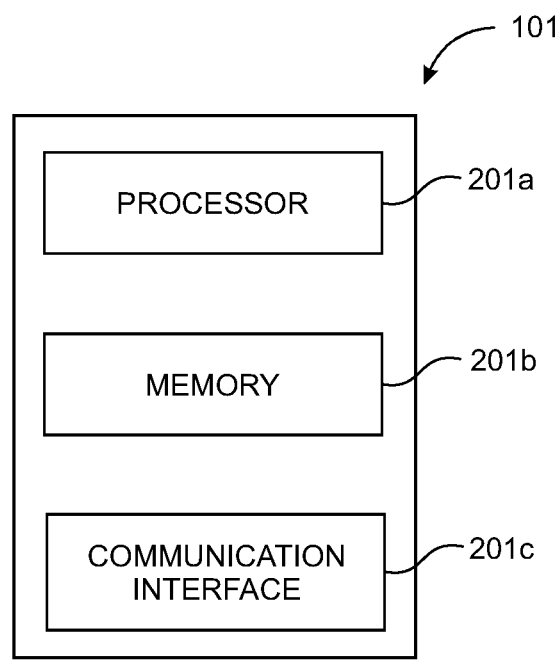
Figure 3:
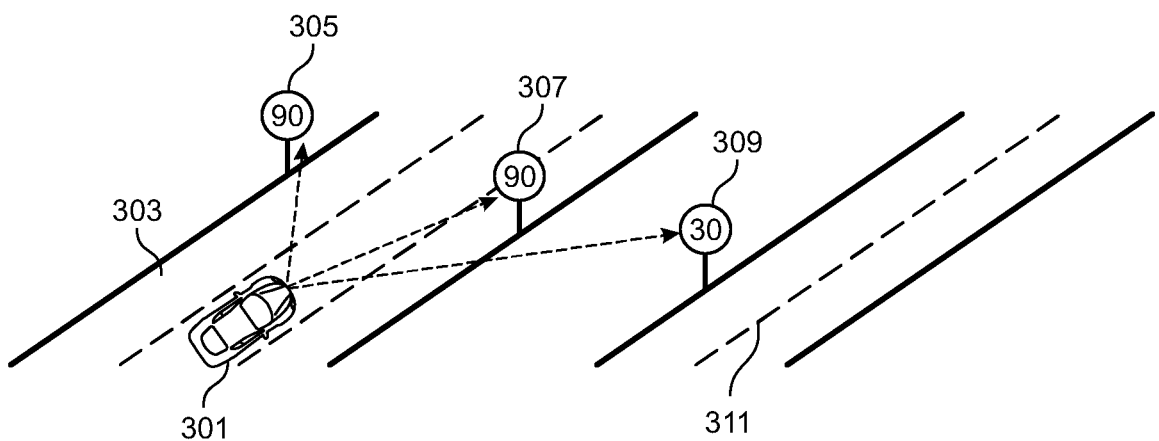
Figure 4:
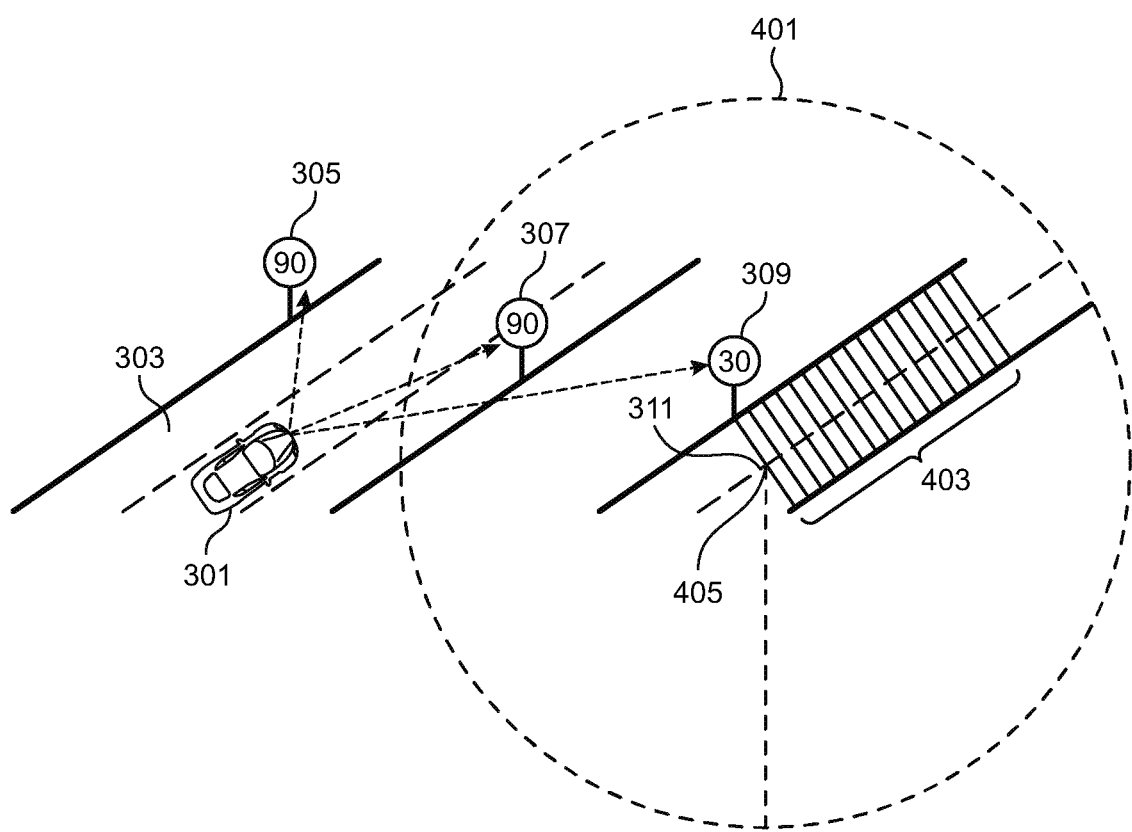
Figure 5A:
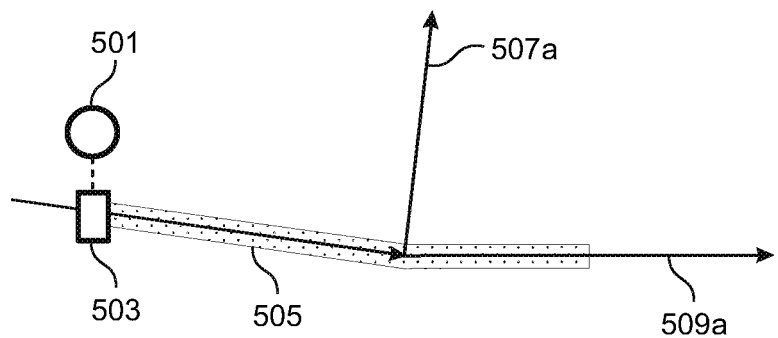
Figure 5B:
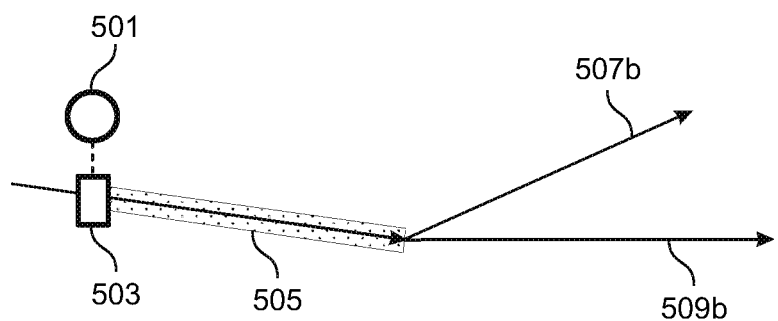
Figure 6:
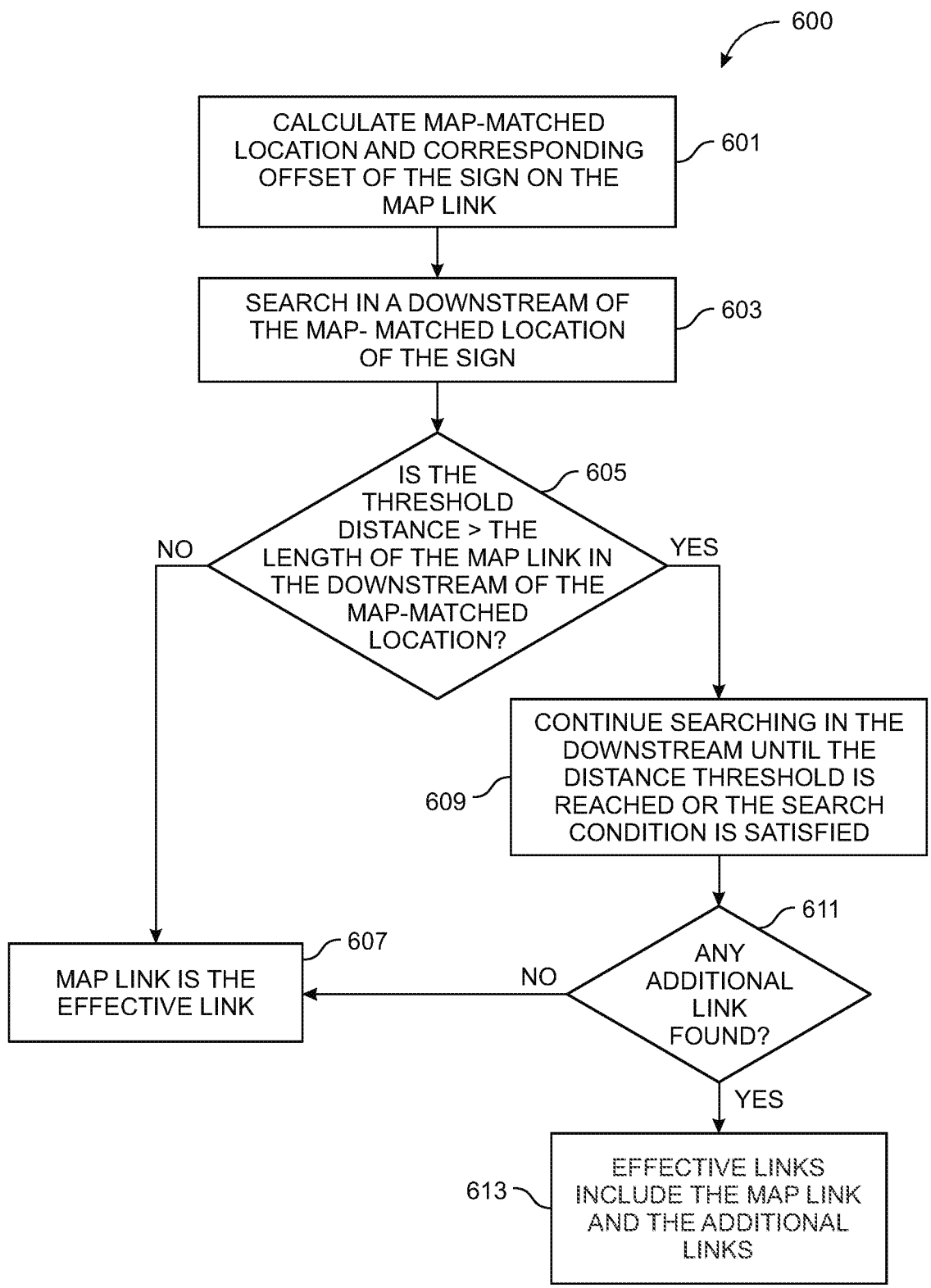
Figure 8:
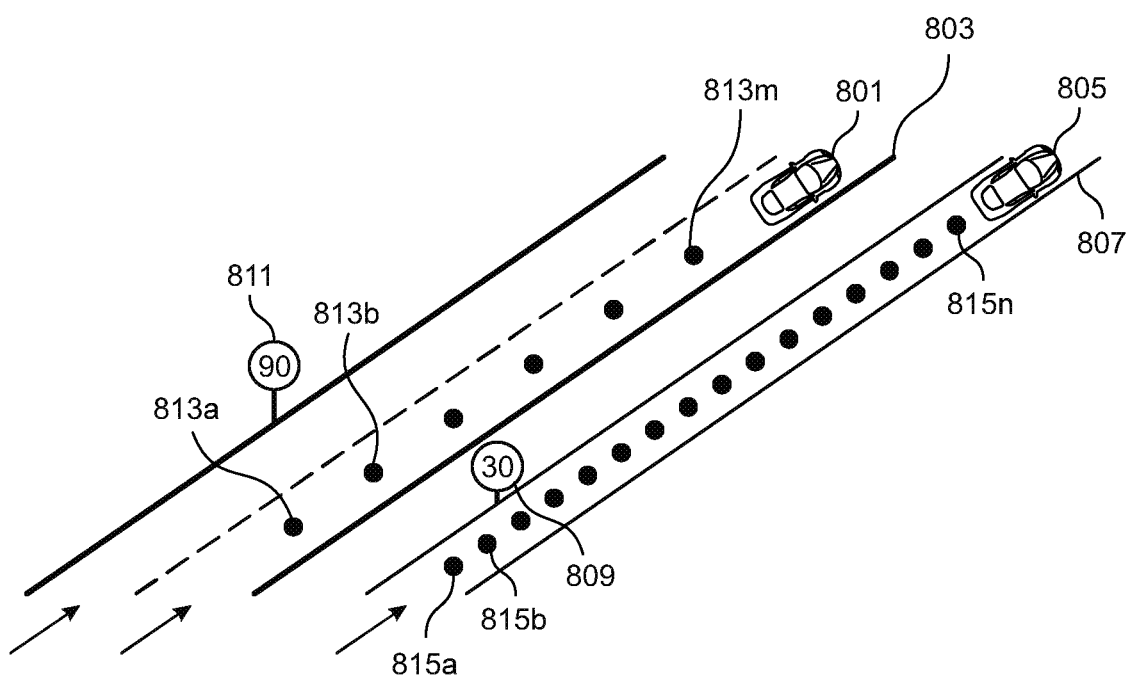
Figure 9:
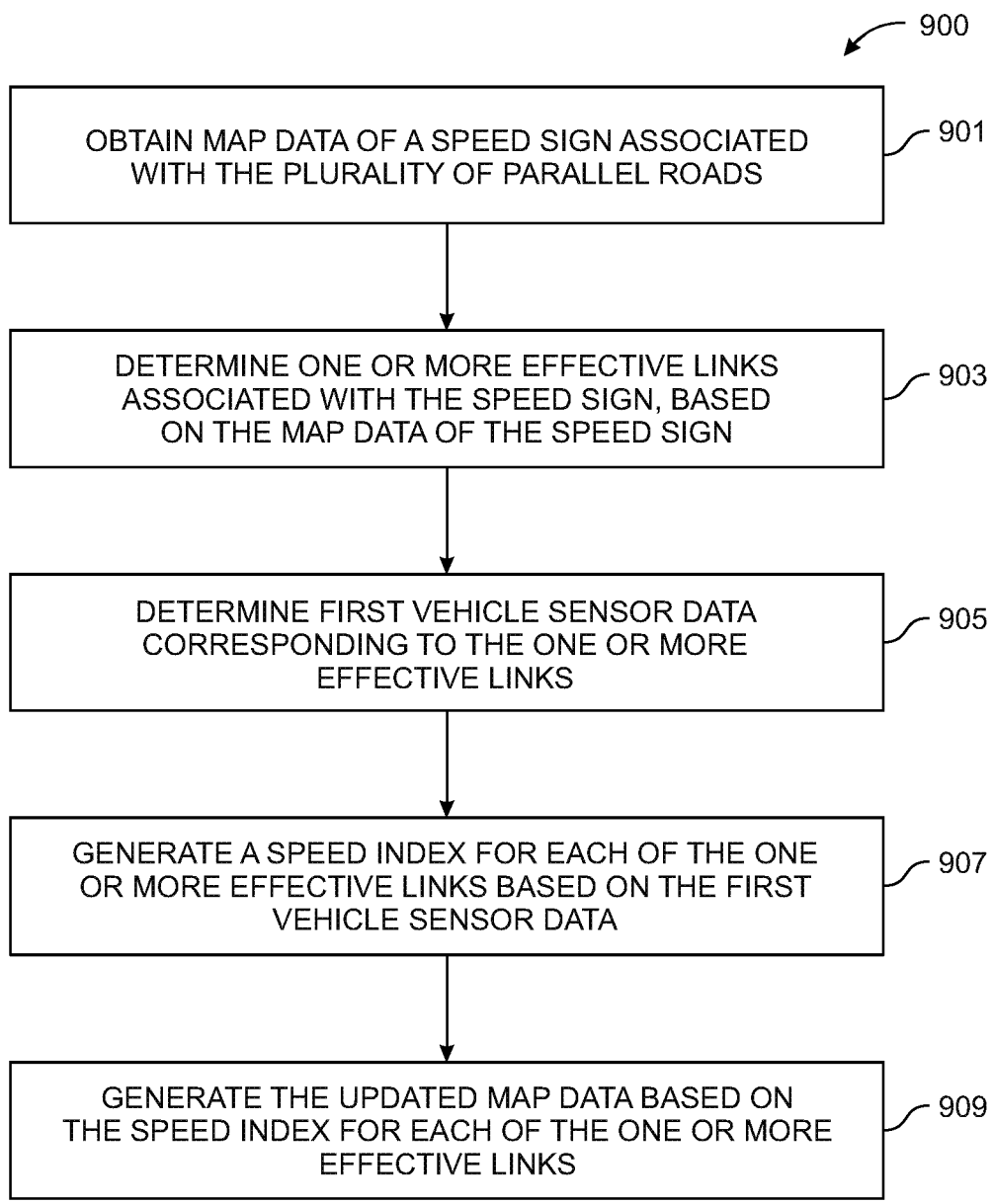

Having thus described example embodiments of the invention in general terms, reference will now be made to the accompanying drawings, which are not necessarily drawn to scale, and wherein:

FIG. 1 illustrates a schematic diagram of a network environment of a system for generating updated map data for parallel roads, in accordance with an example embodiment;

FIG. 2 illustrates a block diagram of the system for generating updated map data for parallel roads, in accordance with an example embodiment;

FIG. 3 illustrates an exemplary scenario depicting a problem of sign recognition on parallel roads;

FIG. 4 illustrates an exemplarily scenario for determining effective links associated with a speed sign, in accordance with an example embodiment;

FIGS. 5A and 5B illustrate scenarios describing extraction of a downstream link, in accordance with an example embodiment;

FIG. 6 illustrates a flowchart for implementation of an exemplary method for determining effective links, in accordance with an example embodiment;

FIG. 7 illustrates an exemplary representation of speed data generated by the system, in accordance with an example embodiment;

FIG. 8 illustrates an exemplary scenario describing generation of vehicle speed index by the system, in accordance with one example embodiment; and FIG. 9 illustrates a flowchart for implementation of an exemplary method for generating updated map data for parallel roads, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "speed sign" may refer to signs positioned at the side of or above roads to provide speed limit information to road users. The speed signs may include but not limited to static speed limit sign, dynamic speed limit sign and the like.

The term "link" may refer to any connecting pathway including but not limited to a roadway, a highway, a freeway, an expressway, a lane, a street path, a road, an alley, a controlled access roadway, a free access roadway and the like.

The term "route" may refer to a path from a source location to a destination location on any link.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

End of Definitions

A method, system, and computer program product are provided herein in accordance with an example embodiment for generating updated map data for parallel roads. In some example embodiments, the method, system, and computer program product provided herein may also be used for accurate sign learning on parallel roads. The method, system, and computer program product disclosed herein provide measures for ensuring high accuracy in learning a speed sign thereby leading to generation of updated map data for a map database in near real time. Since the number of vehicles utilized for learning the road signs may be very high (few thousands), the map database may be updated in near real time. Therefore, embodiments of the present disclosure provide highly reliable map data that can be used for high-end applications such as but not limited to autonomous or self-driving vehicles.

The method, system, and computer program product disclosed herein further provide a notification message based on the updated map data. The notification message may for example, inform a vehicle about availability of accurate and up to date map data for a region. Alternately, the available up to date map data may be pushed as an update to the vehicle. In this way, a beneficiary of the map data (such as the vehicle) can be provided with highly accurate navigation assistance based on the up to date map data. These and other technical improvements of the invention will become evident from the description provided herein.

FIG. 1 illustrates a schematic diagram of a network environment 100 of a system 101 for generating updated map data for parallel roads, in accordance with an example embodiment. The system 101 may be communicatively coupled to one or more of a mapping platform 103, a service platform 109, a plurality of content providers 111a . . . 111n, user equipment (UE) 113, an OEM cloud 117 connected to UE 115, via a network 119. The mapping platform 103 may include a server 105 and a database 107. Further, the server 105 and the database 107 may be communicatively coupled to each other. The service platform 109 may comprise a plurality of services 109a . . . 109n. The mapping platform 103 may be communicatively coupled to the services platform 109 and the plurality of content providers 111a . . . 111n, via the network 119. Further, the services platform 109 and the plurality of content providers 111a . . . 111n may be communicatively coupled to each other. In some example embodiments, a user equipment such as the user equipment 113 may be communicatively coupled to the mapping platform 103, directly via the network 119. Additionally or alternately, in some example embodiments, a user equipment such as the user equipment 115 may be communicatively connected to the OEM cloud 117 which in turn may be accessible to the mapping platform 103 via the network 119. All the components in the network environment 100 may be coupled directly or indirectly to the network 119. The components described in the network environment 100 may be further broken down into more than one component and/or combined together in any suitable arrangement. Further, one or more components may be rearranged, changed, added, and/or removed. Furthermore, fewer or additional components may be in communication with the system 101, within the scope of this disclosure.

The system 101 may be embodied in one or more of several ways as per the required implementation. For example, the system 101 may be embodied as a cloud based service or a cloud based platform. As such, the system 101 may be configured to operate outside the user equipment 113 and/or 115. However, in some example embodiments, the system 101 may be embodied within the user equipment 113 and/or 115, for example as part of an in-vehicle navigation system. In each of such embodiments, the system 101 may be communicatively coupled to the components shown in FIG. 1 to carry out the desired operations and wherever required modifications may be possible within the scope of the present disclosure.

The mapping platform 103 may comprise suitable logic, circuitry, interfaces and code that may be configured to store map data associated with the one or more road objects and map features. The server 105 of the mapping platform 103 may comprise processing means and communication means. For example, the processing means may comprise one or more processors configured to process requests received from the system 101 and/or the user equipment 113, 115. The processing means may fetch map data from the database 107 and transmit the same to the system 101 and/or the user equipment 113, 115 in a suitable format. In one or more example embodiments, the mapping platform 103 may periodically communicate with the user equipment 113 or 115 via the processing means to update a local cache of the map data stored on the user equipment 113, 115. Accordingly, in some example embodiments, map data may also be stored on the user equipment 113, 115 and may be updated based on periodic communication with the mapping platform 103.

The database 107 of the mapping platform 103 may store map data of one or more geographic regions such as a city, province, country or of the entire world. The database 107 may store point cloud data collected from the user equipment 113 and/or 115. The database 107 may store node data, road segment data, link data, point of interest (POI) data, link identification information, heading value records and the like. The database 107 may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 107 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 107 may also store data about the POIs and their respective locations in the POI records. The database 107 may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the database 107 may include event data (e.g., traffic incidents, construction activities, scheduled events, unscheduled events, accidents, diversions etc.) associated with the POI data records or other records of the database 107. Optionally or additionally, the database 107 may store 3D building maps data (3D map model of objects) of structures surrounding roads and streets.

The database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 113, 115. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 107 may be a master geographic database, but in alternate embodiments, the database 107 may be embodied as a client-side map database and may represent a compiled navigation database that may be used in or with end user devices (such as user equipment 113, 115) to provide navigation and/or map-related functions. In such a case, the database 107 may be downloaded or stored on the end user devices (such as user equipment 113, 115).

The services platform 109 may provide navigation related functions and the plurality of services 109a . . . 109n to the user equipment 113, 115. The plurality of services 109a . . . 109n may include navigation functions, speed adjustment functions, traffic related updates, weather related updates, warnings and alerts, parking related services and indoor mapping services. In accordance with an embodiment, the plurality of services 109a . . . 109n may be provided by the plurality of content providers 111a . . . 111n. In some examples, the plurality of content providers 111a . . . 111n may access various Software Development Kits (SDKs) from the services platform 109 for implementation of the plurality of services 109a . . . 109n. In accordance with an embodiment, the services platform 109 and the mapping platform 103 may be integrated into a single platform to provide a suite of mapping and navigation related applications for OEM devices, such as the user equipment 115. The user equipment 113, 115 may be configured to interface with the services platform 109, the plurality of content provider 111a . . . 111n, and the mapping platform 103 over the network 119. Thus, the mapping platform 103 and the services platform 109 may enable provision of cloud-based services for the user equipment 113, 115, such as, storing the sensor data in the OEM cloud 117 in batches or in real-time and retrieving the stored sensor data for determining boundary data of the top surface of each of the one or more objects.

The plurality of content providers 111a . . . 111n may be configured to maintain data stored in the database 107. The plurality of content provider 111a . . . 111n such as a map developer may maintain the mapping platform 103. By way of example, the map developer may collect geographic data to generate and enhance the mapping platform 103. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. Crowdsourcing may be based on gathering data using customer vehicles. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform the database 107 of features within an environment that are appropriate for mapping. For example, motion sensors, inertia sensors, image capture sensors, proximity sensors, LiDAR (light detection and ranging) sensors, ultrasonic sensors etc. The gathering of large quantities of crowd-sourced data may facilitate the accurate modeling and mapping of an environment, whether it is a road segment, a road sign or the interior of a multi-level parking structure. Also, remote sensing, such as aerial or satellite photography, may be used to generate map geometries directly or through machine learning as described herein.

The user equipment 113, 115 may be any user accessible device such as a mobile phone, a smartphone, a portable computer, and the like that is portable in itself or as a part of another portable/mobile object such as a vehicle. In some example embodiments, user equipment 113, 115 may be vehicles. Accordingly, hereinafter the user equipment 113, 115 may also be referred to as vehicles 113, 115. The user equipment 113, 115 may comprise a processor, a memory and a communication interface. The processor, the memory and the communication interface may be communicatively coupled to each other. In some example embodiments, the user equipment 113, 115 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. As such, the user equipment 113, 115 may be an autonomous semi-autonomous vehicle or a manually driven vehicle. In such example embodiments, the user equipment 113, 115 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 113, 115. Additional, different, or fewer components may be provided. For example, the user equipment 113, 115 may be configured to execute and run mobile applications such as a messaging application, a browser application, a navigation application, and the like. At least one user equipment such as user equipment 113 may be directly coupled to the system 101 via the network 119. For example, the user equipment 113 may be a dedicated vehicle (or a part thereof) for gathering data for development of the map data in the database 107. In some example embodiments, at least one user equipment such as the user equipment 115 may be coupled to the system 101 via the OEM cloud 117 and the network 119. For example, the user equipment 115 may be a consumer vehicle (or a part thereof) and may be a beneficiary of the services provided by the system 101 and/or the mapping platform 103. In some example embodiments, one or more of the user equipment 113 and 115 may serve the dual purpose of a data gatherer and a beneficiary device. The user equipment 113 or 115 may be configured to capture sensor data associated with a road which the user equipment 113, 115 may be traversing. The sensor data may for example be image data of road objects, road signs, or the surroundings (for example buildings, road objects, and the like).

The sensor data may refer to sensor data collected from a sensor unit in the user equipment 113 or user equipment 115. In accordance with an embodiment, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LiDAR point cloud data may include point measurements from real-world objects or photos for a point cloud data that may then be translated to a 3D mesh or NURBS or CAD model. In accordance with an embodiment, the sensor data may be converted to units and ranges compatible with the mapping platform 103, to accurately receive the sensor data.

The network 119 may comprise suitable logic, circuitry, and interfaces that may be configured to provide a plurality of network ports and a plurality of communication channels for transmission and reception of data, such as the sensor data, map data from the database 107, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 119 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 119 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 2 illustrates a block diagram of the system 101 for generating updating map data for parallel roads, in accordance with an example embodiment. The system 101 may comprise a processing means such as processor 201a, storage means such as memory 201b, and a communication means such as communication interface 201c. The processor 201a may retrieve computer program code instructions that may be stored in the memory 201b for execution of the computer program code instructions.

The processor 201a may be embodied in a number of different ways. For example, the processor 201a may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201a may include one or more processing cores configured to perform independently. A multi-core processor may enable multiprocessing within a single physical package. Additionally or alternatively, the processor 201a may include one or more processors configured in tandem via the bus to enable independent execution of instructions, pipelining and/or multithreading. Additionally or alternatively, the processor 201a may include one or more processors capable of processing large volumes of workloads and operations to provide support for big data analysis. In an example embodiment, the processor 201a may be in communication with a memory 201b via a bus for passing information among components of the system 101.

The memory 201b may be non-transitory and may include, for example, one or more volatile and/or non-volatile memories. In other words, for example, the memory 201b may be an electronic storage device (for example, a computer readable storage medium) comprising gates configured to store data (for example, bits) that may be retrievable by a machine (for example, a computing device like the processor 201a). The memory 201b may be configured to store information, data, content, applications, instructions, or the like, for enabling the apparatus to carry out various functions in accordance with an example embodiment of the present invention. For example, the memory 201b could be configured to buffer input data for processing by the processor 201a. As exemplarily illustrated in FIG. 2, the memory 201b may be configured to store instructions for execution by the processor 201a. As such, whether configured by hardware or software methods, or by a combination thereof, the processor 201a may represent an entity (for example, physically embodied in circuitry) capable of performing operations according to an embodiment of the present invention while configured accordingly. Thus, for example, when the processor 201a is embodied as an ASIC, FPGA or the like, the processor 201a may be specifically configured hardware for conducting the operations described herein. Alternatively, as another example, when the processor 201a is embodied as an executor of software instructions, the instructions may specifically configure the processor 201a to perform the algorithms and/or operations described herein when the instructions are executed. However, in some cases, the processor 201a may be a processor specific device (for example, a mobile terminal or a fixed computing device) configured to employ an embodiment of the present invention by further configuration of the processor 201a by instructions for performing the algorithms and/or operations described herein. The processor 201a may include, among other things, a clock, an arithmetic logic unit (ALU) and logic gates configured to support operation of the processor 201a.

In some embodiments, the processor 201a may be configured to provide Internet-of-Things (IoT) related capabilities to users of the system 101 disclosed herein, such as, speed limit recommendations to the user or automatic speed adjustments for autonomous vehicles. The IoT related capabilities may in turn be used to provide smart city solutions by providing route selection updates, big data analysis, and sensor-based data collection by using the cloud based mapping system for providing navigation and route recommendation services to the autonomous delivery vehicle. In some embodiments, the system 101 may be configured to provide an environment for development of real time speed update recommendation and the best possible route selection strategy recommendation solutions for navigation systems in accordance with the embodiments disclosed herein. The environment may be accessed using the communication interface 201c.

The communication interface 201c may comprise input interface and output interface for supporting communications to and from any component with which the system 101 may communicate. The communication interface 201c may be any means such as a device or circuitry embodied in either hardware or a combination of hardware and software that is configured to receive and/or transmit data to/from a communications device. In this regard, the communication interface 201c may include, for example, an antenna (or multiple antennae) and supporting hardware and/or software for enabling communications with a wireless communication network. Additionally or alternatively, the communication interface 201c may include the circuitry for interacting with the antenna(s) to cause transmission of signals via the antenna(s) or to handle receipt of signals received via the antenna(s). In some environments, the communication interface 201c may alternatively or additionally support wired communication. As such, for example, the communication interface 201c may include a communication modem and/or other hardware and/or software for supporting communication via cable, digital subscriber line (DSL), universal serial bus (USB) or other mechanisms.

FIG. 3 illustrates an exemplary scenario depicting a problem of sign recognition on parallel roads. A vehicle 301 (such as the user equipment 113 or 115 illustrated in FIG. 1) may be traveling on a main link 303 on which road signs 305 and 307 may be posted. Another road sign 309 may be posted on a mirror link 311. The main link 303 and the mirror link 311 may be parallel to each other and therefore may be referred to as parallel roads. Hereinafter, the signs 305, 307, and 309 may also be referred to as speed signs. However, within the scope of this disclosure, it may be contemplated that the road signs 305, 307, and 309 may correspond to non-speed signs as well. In some example embodiments, the speed signs 305, 307, and 309 indicate a speed of 90 KMPH, 90 KMPH and 30 KMPH, respectively.

The speed signs 303, 305, and 307 may fall within a field of view of the onboard sensors of the vehicle 301 and may thus be captured by the vehicle 301. The vehicle 301 may process the captured speed signs 305, 307, and 309, and report them as being posted on the link which the vehicle 301 may be traversing (in this case the main link 303). However, since the sign 309 is posted on the mirror link 311, the vehicle 301 may report erroneous map data regarding the sign observations for sign 309. This problem may be referred to as a parallel road problem. When such erroneous sign observation is learnt and is used to build/update a map database (such as the database 107 of the mapping platform 103) the map database cannot be regarded as reliable and users of such a map database may be provided with improper navigation assistance. Alternately, if the erroneous observation is utilized locally by the vehicle 301 for performing navigation functions, the vehicle 301 may not be able to correctly comprehend the sign observations which can lead to undesired situations such as accidents.

In some example embodiments, the system 101 may provide measures for rectifying the aforesaid parallel road problem. For example, when the sign observation is reported at the mapping platform 103 for learning purposes, the mapping platform 103 may trigger and invoke the system 101 to generate accurate map data corresponding to the sign observation if it is found that the sign observation is likely prone to a potential parallel road problem. Alternately, the system 101 may be invoked on demand or routinely to detect and correct the map data learnt for signs that may be prone to the parallel road problem.

Referring to FIG. 3, in an example embodiment, the vehicle 301 may capture and report to the mapping platform 103 sign observations for signs 305, 307 and 309 as being associated with the main link 303. In response the mapping platform 103 may determine whether parallel roads exist for the reported signs/link. In the exemplary scenario depicted in FIG. 3, the mirror link 311 does exist as the parallel road for main link 303. Accordingly, the mapping platform 103 may invoke the system 101 to rectify the parallel road problem for the reported signs.

On being triggered, the system 101 may obtain map data of the reported signs 305, 307 and 309 from the database 107. Hereinafter description regarding working of the system 101 is provided with reference to the speed sign 309. However it may be contemplated that within the scope of this disclosure the system 101 may operate in a similar fashion for the other speed signs 305 and 307 as well. The map data of the speed sign 309 may comprise geo-location, map-matched location, map-matched link, heading information, sign type, sign permanency, sign value and the like. The system 101 may determine one or more effective links for the speed sign 309, a detailed description of which is provided next with reference to FIG. 4.

FIG. 4 illustrates an exemplarily scenario for determining effective links associated with the speed sign 309. The system 101 may determine a map-matched location 405 of the speed sign 309 from the map data of the speed sign 309. The system 101 may also determine an offset between the geo-location of the speed sign 309 and the map-matched location 405. Using the map data of the speed sign 309, the system 101 may perform a search for one or more connected links in a downstream of the speed sign 309. The search may be performed from the map-matched location 405 of the speed sign 309 for a threshold distance and one or more downstream links may be obtained based on one or more conditions. The obtained one or more downstream links may be considered to be the effective links. The threshold distance may be a configurable value. For example, in some embodiments, the threshold distance may be 60 meters. It may be contemplated that the value of the threshold distance may be defined considering factors such as link lengths, road type etc.

In some example embodiments, where the link length of the map-matched link of the speed sign 309 is more than the threshold distance, the search may terminate and only the map-matched link (i.e. the mirror link 311) may be returned as the effective link. In some alternate example embodiments, if the threshold distance is more than the link length of the map-matched link (i.e. mirror link 311) of the speed sign 309, the search may continue in further downstream of the map-matched link of the speed sign 309 until a search condition is fulfilled or the threshold distance is reached. The links in the downstream of the map-matched link of the speed sign 309 may be filtered on the basis of one or more downstream link filtering conditions and the search may continue in only those links for which the downstream link filtering conditions are met. The one or more downstream link filtering conditions may comprise for example a criterion that a heading difference between the downstream link and its preceding link is less than or equal to a threshold value. The search condition may be fulfilled when more than one link in the downstream of the speed sign 309 satisfies the downstream link filtering criterion. The search may be terminated at the node at which the search condition is fulfilled. The extraction of the one or more effective links is explained next with reference to FIGS. 5A and 5B.

FIGS. 5A and 5B illustrate scenarios describing extraction of one or more effective links, in accordance with an example embodiment. As shown in FIG. 5A, numeral 501 may correspond to the geolocation of the speed sign 309, numeral 503 may correspond to the map-matched location 405 of the speed sign 309, and numeral 505 may correspond to the map-matched link (i.e. the mirror link 311) of the speed sign 309. Links 505, 507a, and 509a may exist in the downstream of the map-matched location 503 of the speed sign 309. The link 505 being the first link in the downstream of the map-matched location 503 may qualify as the effective link and the search may continue in the downstream of link 505 until the search condition is fulfilled or the threshold distance from the map-matched location 503 is reached.

In the downstream of link 505, links 507a and 509a may together constitute paired links having a common connecting node. For the links 507a and 509a, the system 101 may determine the heading difference of each of the links 507a and 509a with respect to the link 505 and determine which link satisfies the downstream link filtering conditions. In some example embodiments, the threshold value for the downstream link filtering conditions may be set as 45°. As is shown in FIG. 5A, the heading difference of link 509a with respect to the preceding link (i.e. 505) is less than 45°, whereas the same for link 507a is greater than 45°. Thus, link 509a may qualify as the effective link and further search in downstream of link 509a may continue similarly until the search condition is fulfilled or the threshold distance from the map-matched location 503 is reached.

In an alternate embodiment, shown in FIG. 5B, if more than one link in the downstream of link 505 satisfy the downstream link filtering conditions then the search may be terminated at the link 505 and in that case only link 505 may qualify as the effective link. For example, as is shown in FIG. 5B, both of link 507b and link 509b may have a heading difference with respect to the link 505 as less than 45 degrees i.e. both the link may satisfy the downstream link filtering conditions. As such, none of them qualify as the effective link and the downstream links existing from the map-matched location 503 to the preceding link qualify as the effective links. Hence in the exemplary scenario depicted in FIG. 5B, the system 101 may determine link 505 as the only effective link and the search may be terminated. The steps to determine the effective links for the speed sign 309 is explained next with reference to FIG. 6.

FIG. 6 illustrates a flowchart of an exemplary method 600 for determining effective links for the speed sign 309, in accordance with an example embodiment. FIG. 6 is described in conjunction with the description of FIGS. 3-5B. At 601, the method may include calculating a map-matched location and corresponding offset of the sign 309 on the map link 311. At 603, the method may include searching in a downstream of the map-matched location 405 of speed sign 309, for the one or more downstream links. The search is performed for selecting the one or more effective links, among the one or more downstream links based on a threshold distance and the map link. At 605, the method may include checking if the threshold distance is greater than the length of map link 311 in the downstream of the map-matched location 405. When the threshold distance is less than the length of the map link 311, at 607, only the map link 311 may be selected as the effective link.

Alternately, if the threshold distance is greater than the length of map link 311 in the downstream of the map-matched location 405, at 609, the search continues further in the downstream of the map-matched location 405, until the threshold distance is reached or the search condition is fulfilled. At 611, the method includes determining whether any additional link is found at step 609. If any additional link is found at step 609, the control at 611 passes to 613 and the map link and the additional link(s) are returned as the effective links. If however, at 611, it is determined that no additional link is found, the control passes to step 607 and only the map link 311 is returned as the effective link.

Once the effective links for the speed sign 309 are determined, the system 101 may determine vehicle speed data for the parallel roads. Referring back to FIG. 4, the system 101 may define a region within a threshold radius from the speed sign 309. The region may be a circular region shown as the map area enclosed by the circle 401 in FIG. 4. Alternately, the region may be of any arbitrary shape and size. Hereinafter, the region and the circle may be used interchangeably and referred to as region 401 or circle 401. Any suitable value that is larger than the threshold distance for searching the effective links may be chosen as the threshold radius. In some example embodiments, if the threshold distance is 60 meters, the threshold radius may be selected for example as 80 meters. Next, the system 101 may perform a search for vehicle sensor data within the region 401. The system 101 may query the map database (such as the database 107) to obtain sensor data reported by vehicles that traversed the links in the region 401. Therefore, vehicle sensor data for the region 401 may be obtained. The system 101 may then map-match the obtained vehicle sensor data to the extracted one or more effective links 403. Since, the threshold radius is larger than the threshold distance, the one or more effective links 403 are most likely subsets of the links in the region 401. In other words, the one or more effective links 403 lie within the circle 401. Thus, at least a portion of the obtained vehicle sensor data may be map-matched to the extracted one or more effective links 403.

The obtained vehicle sensor data may be map-matched using the map data of the links in the region and the offsets calculated for those links.

The system 101 may utilize the map-matched vehicle sensor data of each of the effective links 403 to calculate a speed index for the respective effective link. To this end, for each of the effective links 403, one or more of a mean speed, a median speed, an 85th percentile speed (usually taken as the free flow speed) and a standard deviation of speed from the map-matched vehicle sensor data of the respective effective link may be calculated as speed data. The calculated speed data may be represented in a data format as shown in FIG. 7.

The calculated speed data for the effective links 403 may for example, include speed data for current map-matched link 311, left parallel link and right parallel link (if any), for the speed sign 309. In some example embodiments, the speed data may be calculated for a downstream distance of 100 meters from the map-matched location 405 of the speed sign 309. The $85^{th}$ percentile speed may be considered to be the free flow speed. Therefore, the speed data for the speed sign 309 may be represented with respect to the one or more map-matched links and the plurality of parallel links for the speed sign 309.

In some example embodiment, the mean speed may be an average running speed limit for a link. As distribution of running speed is proved to have a normal distribution, the mean speed can represent a normal condition. In some example embodiments, the median speed may be a better indicator because sometimes the distribution of the running speed may be right-skewed. The median speed can remove some outliers of extremely high speed values. The percentile speed is a speed limit value most closely related to the speed limit value of a speed sign. The percentile may be set around 85%. The standard deviation represents a deviation level of the speed data for the speed sign. The speed index of each of the effective links may be calculated as any of the speed metrics in the speed data represented in FIG. 7.

FIG. 8 illustrates an exemplary scenario describing generation of vehicle speed index by the system 101, in accordance with one example embodiment. A first vehicle 801 may be travelling on a first link 803 while a second vehicle 805 may be travelling on a second link 807 that is parallel to the first link 803. In doing so, the vehicle 801 may detect speed signs 809 and 811 having speed sing values of 90 KMPH and 30 KMPH respectively. The first vehicle 801 may provide a plurality of traces, for example corresponding to points 813a, 813b . . . 813m on the first link 803. These traces may correspond to the map-matched vehicle sensor data for the first link 801. Based on the traces of the first vehicle 801, the speed of the first vehicle 801 may be derived. In the example embodiment depicted in FIG. 8, since subsequent traces are widely apart from each other, the derived speed for the first vehicle 801 may be higher than a threshold and thus may be closer to the value of the speed sign 811 (i.e. 90 KMPH).

The second vehicle 805 travelling on the second link 807 may also detect the speed signs 809 and 811. The second vehicle 805 may provide a plurality of traces 815a, 815b . . . 815n on the second link 807. Based on the traces of the second vehicle 805, the speed of the second vehicle 805 may be derived. In the example embodiment depicted in FIG. 8, since subsequent traces are closely spaced from each other, the derived speed of the second vehicle 805 may be lower than a threshold and may be closer to the value of the speed sign 809 (i.e. 30 KMPH).

In some example embodiments, several vehicles like the first vehicle 801 may travel on the link 803. Similarly, several vehicles like the second vehicle 805 may travel on the link 807. In such cases, an aggregate of the derived speed of all the vehicles travelling on the link may be considered to derive a mean value or a median value or a percentile value of the derived vehicle speed and the same is considered as the speed index for that link. Since traffic sign recognition is a point based process, continuous traffic data of a vehicle is converted into point based index.

Referring back to FIG. 4, in the manner described above with reference to FIGS. 7 and 8, the speed index of each of the effective links 403 may be calculated. The system 101 may then determine a sign value of the speed sign 309. For this, the system 101 may query the map database or a ground truth database to obtain the sign value of the speed sign 309. The system 101 may then compare the sign value of the speed sign 309 and the speed index of each of the effective links 403 to determine a best match link among the effective links 403. That is the system 101 may select the effective link whose speed index is closest to the sign value of the speed sign 309 as the best match link among the effective links 403. In the example embodiment depicted in FIG. 4, since the speed sign is posted on the mirror link 311, the calculated speed index of the mirror link 311 is the closest to the sign value of the speed sign 309. Thus the mirror link 311 is the actual map link for the speed sign 309. Therefore, the system 101 may update the learned link of the speed sign 309 from the main link 303 to the mirror link 311. This way, the mapping platform 103 may be updated to learn the correct map data for the speed sign 309, even when a parallel road problem may exist for the speed sign 309.

Although the aforesaid description of FIGS. 3-8 is provided with reference to the speed sign 309, however, it may be understood that the invention would work in a similar manner for the speed signs 305 and 307 as well. In this way, every time a sign observation is reported by a vehicle (such as the vehicle 301 or user equipment 113, 115), the mapping platform 103 may invoke the system 101 to verify if the reported sign observation is accurate. The system 101 may generate the speed index of each effective link of each speed sign and compare it with the sign value of the respective speed sign to determine if the map link of the speed sign reported in the sign observation is same as the best match link determined for the speed sign. In case it is different, the system 101 may generate a notification message and/or transmit the correct map link (i.e. the map data of the best match link) to the mapping platform 103 and/or an end user device of the mapping platform 103. Alternately, if the erroneous sign observation is already learnt in the mapping platform 103, the system 101 may determine such signs for which the map link does not match with the best match link and thereby update the map data to reflect the correct map link (i.e. the map data of the best match link). Additionally or optionally, the updated map data may be provided to an end user, as an update which may be downloaded from the mapping platform 103. The update may be provided as a run time update or a pushed update.

FIG. 9 illustrates a flowchart for implementation of an exemplary method 900 for generating updated map data for parallel roads, in accordance with an example embodiment. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described may be embodied by computer program instructions. In this regard, the computer program instructions which embody the described procedures may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

At 901, the method comprises obtaining map data of a speed sign associated with a plurality of parallel roads. The map data may be obtained from the map database 107 of the mapping platform 103. The map data of the speed sign 309 may comprise geo-location, map-matched location, map-matched link data, heading information, sign type, sign permanency, sign value and the like of the speed sign At 903, the method comprises determining one or more effective links associated with the speed sign, based on the map data of the speed sign. To determine the one or more effective links firstly, a map-matched location of the speed sign may be determined based on the map data of the speed sign. One or more downstream links in a downstream of the speed sign may then be searched, based on the map data of the speed sign and the map-matched location. The one or more effective links, among the one or more downstream links, may be determined based on a threshold distance from the map-matched location.

At 905, the method comprises determining first vehicle sensor data corresponding to the one or more effective links. Further, for determining the first vehicle sensor data the method comprises obtaining second vehicle sensor data of a region within a threshold distance from the speed sign, map-matching the second vehicle sensor data to one or more first links in the region and determining the first vehicle sensor data for one or more second links of the one or more first links, based on a match of the one or more effective links with the one or more first links.

At 907, the method comprises generating a speed index for each of the one or more effective links based on the first vehicle sensor data. Towards this objective, the method may further comprise determining speed data for the one or more effective links based on the first vehicle sensor data and generating the speed index for each of the one or more effective links based on the speed data for the one or more effective links. The speed data for the one or more effective links may comprise at least one of a mean speed, a median speed, or an $85^{th}$ percentile speed.

At 909, the method comprises generating the updated map data based on the speed index for each of the one or more effective links. Further, for generating the updated map data the method comprises generating speed value of the speed sign based on the map data of the speed sign, comparing the speed value of the speed sign and the speed index of each of the one or more effective links to determine a best match link for the speed sign among the one or more effective links and generating the updated map data based on the best match link for the speed sign.

In an example embodiment, the system 101 for performing the method 900 described above may comprise a processor (e.g. the processor 201*a*) configured to perform some or each of the operations (901-909) described above. The processor may, for example, be configured to perform the operations (901-909) by performing hardware implemented logical functions, executing stored instructions, or executing algorithms for performing each of the operations. Alternatively, the system may comprise means for performing each of the operations described above. In this regard, according to an example embodiment, examples of means for performing operations 901-909 may comprise, for example, the processor 201*a* and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. The focus is on road signs but the methods and applications discussed herein can also apply to other road objects. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for generating updated map data for a plurality of parallel roads, comprising:
   at least one memory configured to store computer program code instructions; and
   at least one processor configured to execute the computer program code instructions to:
   obtain map data of a speed sign associated with the plurality of parallel roads, wherein the map data of the speed sign comprises one or more map-matched links;
   determine one or more effective links associated with the speed sign, based on the map data of the speed sign, wherein the one or more effective links comprise the one or more map-matched links and one or more downstream connected links that satisfy one or more downstream link filtering conditions, wherein the downstream filtering conditions comprise a condition that where more than one downstream links have a common connecting node, only one of the more than one downstream links has a heading difference between the downstream link and its preceding link that is less than or equal to a threshold value;

determine first vehicle sensor data corresponding to the one or more effective links;

calculate a speed index, comprising speed data, for each of the one or more effective links based on the first vehicle sensor data;

generate a speed value of the speed sign based on the map data of the speed sign;

compare the speed value of the speed sign and the speed index of each of the one or more effective links to determine a match link for the speed sign among the one or more effective links; and generate the updated map data based on the match link for the speed sign.

2. The system of claim 1, wherein to determine the first vehicle sensor data, the at least one processor is further configured to:

obtain second vehicle sensor data of a region within a threshold distance from the speed sign;

map-match the second vehicle sensor data to one or more first links in the region; and determine the first vehicle sensor data for one or more second links of the one or more first links, based on a match of the one or more effective links with the one or more first links.

3. The system of claim 1, wherein speed data for the one or more effective links is determined based on the first vehicle sensor data.

4. The system of claim 1, wherein the speed data for the one or more effective links comprises at least one of a mean speed, a median speed, or an 85th percentile speed.

5. The system of claim 1, wherein the at least one processor is further configured to:

receive third vehicle sensor data corresponding to the speed sign from one or more users; and transmit a notification message to the one or more users based on the updated map data.

6. A method for generating updated map data for a plurality of parallel roads, the method comprising:

obtaining map data of a speed sign associated with the plurality of parallel roads, wherein the map data of the speed sign comprises one or more map-matched links;

determining one or more effective links associated with the speed sign, based on the map data of the speed sign, wherein the one or more effective links comprise the one or more map-matched links and one or more downstream connected links that satisfy one or more downstream link filtering conditions, wherein the downstream filtering conditions comprise a condition that where more than one downstream links have a common connecting node, only one of the more than one downstream links has a heading difference between the downstream link and its preceding link that is less than or equal to a threshold value;

determining first vehicle sensor data corresponding to the one or more effective links;

calculating by at least one processor, a speed index, comprising speed data, for each of the one or more effective links based on the first vehicle sensor data;

generating a speed value of the speed sign based on the map data of the speed sign;

comparing the speed value of the speed sign and the speed index of each of the one or more effective links to determine a match link for the speed sign among the one or more effective links; and generating the updated map data based on the match link for the speed sign.

7. The method of claim 6, wherein determining the first vehicle sensor data further comprises:

obtaining second vehicle sensor data of a region within a threshold distance from the speed sign;

map-matching the second vehicle sensor data to one or more first links in the region; and determining the first vehicle sensor data for one or more second links of the one or more first links, based on a match of the one or more effective links with the one or more first links.

8. The method of claim 6, further comprising:

determining speed data for the one or more effective links based on the first vehicle sensor data.

9. The method of claim 6, wherein the speed data for the one or more effective links comprises at least one of a mean speed, a median speed or an 85th percentile speed.

10. The method of claim 6, further comprising:

receiving third vehicle sensor data corresponding to the speed sign from one or more users; and transmitting a notification message to the one or more users based on the updated map data.

11. A computer programmable product comprising a non-transitory computer readable medium having stored thereon computer executable instruction which when executed by at least one processor, cause the at least one processor to carry out operations for generating updated map data for a plurality of parallel roads, the operations comprising:

obtaining map data of a speed sign associated with the plurality of parallel roads, wherein the map data of the speed sign comprises one or more map-matched links;

determining one or more effective links associated with the speed sign, based on the map data of the speed sign, wherein the one or more effective links comprise the one or more map-matched links and one or more downstream connected links that satisfy one or more downstream link conditions, wherein the downstream filtering conditions comprise a condition that where more than one downstream links have a common connecting node, only one of the more than one downstream links has a heading difference between the downstream link and its preceding link that is less than or equal to a threshold value;

determining first vehicle sensor data corresponding to the one or more effective links;

calculating a speed index, comprising speed data, for each of the one or more effective links based on the first vehicle sensor data;

generating a speed value of the speed sign based on the map data of the speed sign;

comparing the speed value of the speed sign and the speed index of each of the one or more effective links to determine a match link for the speed sign among the one or more effective links; and generating the updated map data based on the match link for the speed sign.

12. The non-transitory computer-readable storage medium of claim 11, wherein determining the first vehicle sensor data, the operations further comprise:

obtaining second vehicle sensor data of a region within a threshold distance from the speed sign;

map-matching the second vehicle sensor data to one or more first links in the region; and determining the first vehicle sensor data for one or more second links of the one or more first links, based on a match of the one or more effective links with the one or more first links.

13. The non-transitory computer-readable storage medium of claim 11, wherein for generating the speed index for each of the one or more effective links, the operations further comprise:

determining the speed data for the one or more effective links based on the first vehicle sensor data.

14. The non-transitory computer-readable storage medium of claim 11, further comprising:

receiving third vehicle sensor data corresponding to the speed sign from one or more users; and transmitting a notification message to the one or more users based on the updated map data.

15. The system of claim 1, wherein the downstream filtering conditions comprise a condition that the length of a downstream link is less than a threshold distance.

16. The system of claim 1, wherein the downstream filtering conditions comprise a criterion that a heading difference between a downstream link and its preceding link is less than or equal to a threshold value.

17. The method of claim 6, wherein the downstream filtering conditions comprise a condition that the length of a downstream link is less than a threshold distance.

18. The method of claim 6, wherein the downstream filtering conditions comprise a criterion that a heading difference between a downstream link and its preceding link is less than or equal to a threshold value.

* * * * *